(12) United States Patent
Lee et al.

(10) Patent No.: US 10,822,441 B2
(45) Date of Patent: Nov. 3, 2020

(54) SUPER ABSORBENT POLYMER

(71) Applicant: LG Chem, Ltd., Seoul (KR)

(72) Inventors: Sang Gi Lee, Daejeon (KR); Hye Mi Nam, Daejeon (KR); Min Ho Hwang, Daejeon (KR); Soo Jin Lee, Daejeon (KR); Tae Hwan Jang, Daejeon (KR)

(73) Assignee: LG Chem, Ltd. (KR)

( * ) Notice: Subject to any disclaimer, the term of this patent is extended or adjusted under 35 U.S.C. 154(b) by 534 days.

(21) Appl. No.: 15/564,487

(22) PCT Filed: Jun. 10, 2016

(86) PCT No.: PCT/KR2016/006202
§ 371 (c)(1),
(2) Date: Oct. 5, 2017

(87) PCT Pub. No.: WO2016/204458
PCT Pub. Date: Dec. 22, 2016

(65) Prior Publication Data
US 2018/0079847 A1    Mar. 22, 2018

(30) Foreign Application Priority Data

Jun. 15, 2015   (KR) .................. 10-2015-0084371

(51) Int. Cl.
| | | |
|---|---|---|
| B01J 20/26 | (2006.01) | |
| C08F 220/06 | (2006.01) | |
| C08J 3/075 | (2006.01) | |
| C08J 3/12 | (2006.01) | |
| C08J 3/24 | (2006.01) | |
| C08J 9/08 | (2006.01) | |
| C08F 220/10 | (2006.01) | |
| C08F 2/44 | (2006.01) | |
| B01J 20/28 | (2006.01) | |

(52) U.S. Cl.
CPC .......... C08F 220/06 (2013.01); B01J 20/267 (2013.01); B01J 20/28004 (2013.01); C08F 2/44 (2013.01); C08F 220/10 (2013.01); C08J 3/075 (2013.01); C08J 3/12 (2013.01); C08J 3/24 (2013.01); C08J 9/08 (2013.01)

(58) Field of Classification Search
CPC ........ B01J 20/26; B01J 20/267; C08F 220/06; C08J 3/075; C08J 3/12; C08J 3/24
USPC ........................................................ 502/401
See application file for complete search history.

(56) References Cited

U.S. PATENT DOCUMENTS

| | | |
|---|---|---|
| 4,883,478 A | 11/1989 | Lerailler et al. |
| 4,973,632 A | 11/1990 | Nagasuna et al. |
| 5,032,628 A | 7/1991 | Choi et al. |
| 5,118,719 A | 6/1992 | Lind |
| 5,328,935 A | 7/1994 | Van Phan et al. |
| 5,563,218 A | 10/1996 | Rebre et al. |
| 5,712,316 A | 1/1998 | Dahmen et al. |
| 5,985,944 A | 11/1999 | Ishizaki et al. |
| 6,107,358 A | 8/2000 | Harada et al. |
| 6,133,193 A | 10/2000 | Kajikawa et al. |
| 6,174,929 B1 | 1/2001 | Hahnle et al. |
| 6,414,214 B1 | 7/2002 | Engelhardt et al. |
| 6,565,768 B1 | 5/2003 | Dentler et al. |
| 6,750,262 B1 | 6/2004 | Hahnle et al. |
| 7,638,570 B2 | 12/2009 | Torii et al. |
| 2001/0038831 A1 | 11/2001 | Park et al. |
| 2004/0019342 A1 | 1/2004 | Nagasuna et al. |
| 2004/0214946 A1 | 10/2004 | Smith et al. |
| 2005/0054784 A1 | 3/2005 | Qin et al. |
| 2005/0137546 A1 | 6/2005 | Joy et al. |
| 2005/0256469 A1 | 11/2005 | Qin et al. |
| 2006/0204755 A1 | 9/2006 | Torii et al. |
| 2007/0066167 A1 | 3/2007 | Wada et al. |
| 2007/0123658 A1 | 5/2007 | Torii et al. |
| 2007/0141338 A1 | 6/2007 | Ishizaki et al. |
| 2008/0058747 A1 | 3/2008 | Singh Kainth et al. |
| 2008/0139693 A1 | 6/2008 | Ikeuchi et al. |
| 2008/0161499 A1 | 7/2008 | Riegel et al. |
| 2008/0215026 A1 | 9/2008 | Schornick et al. |
| 2008/0234645 A1 | 9/2008 | Dodge et al. |
| 2009/0196848 A1 | 8/2009 | Davis |
| 2010/0057027 A1 | 3/2010 | Furno et al. |
| 2010/0099781 A1 | 4/2010 | Tian et al. |
| 2011/0204288 A1 | 8/2011 | Funk et al. |
| 2011/0313113 A1 | 12/2011 | Sakamoto et al. |

(Continued)

FOREIGN PATENT DOCUMENTS

| | | |
|---|---|---|
| CN | 1856331 A | 11/2006 |
| CN | 101094696 A | 12/2007 |

(Continued)

OTHER PUBLICATIONS

Kabiri, K., et al ..., "Novel approach to highly porous superabsorbent hydrogels: synergistic effect of porogens on porosity and swelling rate." Polymer International, vol. 52, Jan. 7, 2003, pp. 1158-1164.
Kabiri, Kourosh, et al. "Porous Superabsorbent Hydrogel Composites: Synthesis, Morphology and Swelling Rate." Macromolecular Materials and Engineering, Apr. 20, 2004, vol. 289, pp. 653-661.
Lee et al., U.S. Appl. No. 15/554,852, filed Aug. 31, 2017, titled "Method for Preparing Superabsorbent Polymer".
Lee et al., U.S. Appl. No. 15/556,740, filed Sep. 8, 2017, titled "Super absorbent polymer and method for preparing the same".

(Continued)

Primary Examiner — Edward M Johnson
(74) Attorney, Agent, or Firm — Lerner, David, Littenberg, Krumholz & Mentlik, LLP

(57) ABSTRACT

The present invention relates to a super absorbent polymer. In the super absorbent polymer according to the present invention, the content of each of the super absorbent polymer particles having different surface shapes among particles constituting the polymer is optimized, and this not only an absorbent capacity and an absorbency under load are excellent but also the rewetting phenomenon can be effectively prevented.

4 Claims, 5 Drawing Sheets

(56) References Cited

U.S. PATENT DOCUMENTS

| | | |
|---|---|---|
| 2012/0045639 A1 | 2/2012 | Whitmore et al. |
| 2012/0184670 A1 | 7/2012 | Kobayashi et al. |
| 2012/0184684 A1 | 7/2012 | Funk et al. |
| 2012/0219728 A1 | 8/2012 | Badri et al. |
| 2012/0232177 A1 | 9/2012 | Lopez Villanueva et al. |
| 2012/0258851 A1 | 10/2012 | Nakatsuru et al. |
| 2012/0296296 A1 | 11/2012 | Di Cintio et al. |
| 2012/0296297 A1 | 11/2012 | Di Cintio et al. |
| 2012/0296298 A1 | 11/2012 | Gray et al. |
| 2012/0296299 A1 | 11/2012 | Villanueva et al. |
| 2012/0309619 A1 | 12/2012 | Kwon et al. |
| 2013/0102750 A1 | 4/2013 | Watanabe et al. |
| 2013/0172180 A1 | 7/2013 | Naumann et al. |
| 2014/0066584 A1 | 3/2014 | Peterson et al. |
| 2014/0127510 A1 | 5/2014 | Handa et al. |
| 2014/0296423 A1 | 10/2014 | Ebata et al. |
| 2014/0306155 A1 | 10/2014 | Tian et al. |
| 2014/0306156 A1 | 10/2014 | Tian et al. |
| 2014/0312273 A1 | 10/2014 | Wattebled et al. |
| 2014/0364824 A1 | 12/2014 | Ota et al. |
| 2015/0011388 A1 | 1/2015 | Matsumoto et al. |
| 2015/0087742 A1 | 3/2015 | Won et al. |
| 2015/0093575 A1 | 4/2015 | Naumann et al. |
| 2015/0129799 A1 | 5/2015 | Kobayashi et al. |
| 2015/0137546 A1 | 5/2015 | Gaudig |
| 2015/0283284 A1 | 10/2015 | Azad et al. |
| 2016/0108227 A1 | 4/2016 | Wattebled et al. |
| 2016/0151531 A1 | 6/2016 | Lee et al. |
| 2016/0184799 A1 | 6/2016 | Lee et al. |
| 2018/0037686 A1 | 2/2018 | Lee et al. |
| 2018/0050321 A1 | 2/2018 | Lee et al. |
| 2018/0056274 A1 | 3/2018 | Lee et al. |
| 2018/0079847 A1 | 3/2018 | Lee et al. |
| 2018/0265645 A1 | 9/2018 | Nam et al. |
| 2018/0265646 A1 | 9/2018 | Nam et al. |

FOREIGN PATENT DOCUMENTS

| | | |
|---|---|---|
| CN | 101133100 A | 2/2008 |
| CN | 102197057 A | 9/2011 |
| CN | 102666670 A | 9/2012 |
| CN | 102762616 A | 10/2012 |
| CN | 103179931 A | 6/2013 |
| CN | 104024291 A | 9/2014 |
| CN | 104284921 A | 1/2015 |
| CN | 104603159 A | 5/2015 |
| EP | 0555692 A1 | 8/1993 |
| EP | 0615736 A1 | 9/1994 |
| EP | 0644211 A1 | 3/1995 |
| EP | 0744435 A1 | 11/1996 |
| EP | 1400556 A1 | 3/2004 |
| EP | 1637105 A1 | 3/2006 |
| EP | 1730218 B1 | 12/2010 |
| EP | 3248990 A1 | 11/2017 |
| EP | 3260485 A1 | 12/2017 |
| EP | 2797566 B1 | 6/2019 |
| JP | H06313042 A | 11/1994 |
| JP | H09124879 A | 5/1997 |
| JP | H10139916 A | 5/1998 |
| JP | H10251309 A | 9/1998 |
| JP | H11156188 A | 6/1999 |
| JP | 2005154758 A | 6/2005 |
| JP | 2006116535 A | 5/2006 |
| JP | 20070012623 A | 1/2007 |
| JP | 3913867 B2 | 5/2007 |
| JP | 2007314794 A | 12/2007 |
| JP | 2009227885 A | 10/2009 |
| JP | 2011511086 A | 4/2011 |
| JP | 5336704 B2 | 11/2013 |
| JP | 2014098172 A | 5/2014 |
| JP | 2014514128 A | 6/2014 |
| JP | 2014514432 A | 6/2014 |
| JP | 2014518716 A | 8/2014 |
| JP | 2014523452 A | 9/2014 |
| JP | 2015503655 A | 2/2015 |
| JP | 2015150059 A | 8/2015 |
| JP | 2015213911 A | 12/2015 |
| KR | 910008293 B1 | 10/1991 |
| KR | 930007272 B1 | 8/1993 |
| KR | 100269980 B1 | 10/2000 |
| KR | 20050022813 A | 3/2005 |
| KR | 20060015498 A | 2/2006 |
| KR | 20060023116 A | 3/2006 |
| KR | 20090042828 A | 4/2009 |
| KR | 20090123904 A | 12/2009 |
| KR | 20110092236 A | 8/2011 |
| KR | 20120102088 A | 9/2012 |
| KR | 20130120300 A | 11/2013 |
| KR | 20140054324 A | 5/2014 |
| KR | 20140056225 A | 5/2014 |
| KR | 20140094536 A | 7/2014 |
| KR | 20140095569 A | 8/2014 |
| KR | 20140102264 A | 8/2014 |
| KR | 20140107347 A | 9/2014 |
| KR | 20150016126 A | 2/2015 |
| KR | 20150040476 A | 4/2015 |
| KR | 20150116418 A | 10/2015 |
| KR | 20150143624 A | 12/2015 |
| KR | 101582241 B1 | 1/2016 |
| KR | 20160010517 A | 1/2016 |
| WO | 87003208 A1 | 6/1987 |
| WO | 2004096304 A1 | 11/2004 |
| WO | 2005027986 A1 | 3/2005 |
| WO | 2006069732 A1 | 7/2006 |
| WO | 2011026876 A1 | 3/2011 |
| WO | 2014167040 A1 | 10/2014 |
| WO | 2014168858 A1 | 10/2014 |
| WO | 2014168871 A1 | 10/2014 |

OTHER PUBLICATIONS

Lee et al., U.S. Appl. No. 15/558,429, filed Sep. 14, 2017, titled "Super Absorbent Resin".

Nam et al., U.S. Appl. No. 15/556,078, filed Sep. 6, 2017, titled "Method for Manufacturing Super Absorbent Resin".

Nam et al., U.S. Appl. No. 15/556,083, filed Sep. 6, 2017, titled "Method for Preparing Superabsorbent Polymer, and Superabsorbent Polymer Prepared Thereby".

Odian, George, "Principle of Polymerization." Second Edition, (Wiley, 1981), p. 203.

Odian, George, "Principles of Polymerization." Second Edition, Copyright 1981, p. 203.

Schwalm, Reinhold, "UV Coatings: Basics, Recent Developments and New Applications." Elservier Science, Dec. 21, 2016, p. 115.

Schwalm, Reinhold, "UV Coatings: Basics, Recent Developments and New Applications." Elsevier Science, Dec. 21, 2006, p. 115.

Search report from International Application No. PCT/KR2016/003793, dated Dec. 22, 2016.

Search report from International Application No. PCT/KR2016/003946, dated Jul. 29, 2016.

Search report from International Application No. PCT/KR2016/003948, dated Jul. 27, 2016.

Search report from International Application No. PCT/KR2016/005809, dated Aug. 24, 20116.

Search report from International Application No. PCT/KR2016/006202, dated Sep. 12, 2016.

Search report from International Application No. PCT/KR2016/013286, dated Mar. 6, 2017.

Third Party Observation for PCT/KR2016/006202 dated Oct. 16, 2017.

Extended European Search Report including Written Opinion for Application No. EP16803731.5 dated Sep. 3, 2018.

Extended European Search Report including Written Opinion for Application No. EP16811803.2 dated Aug. 27, 2018.

Third Party Observation for Application No. EP16890123.9 dated Jul. 10, 2018.

Third Party Observation for Application No. PCT/KR2016/013286 dated Jun. 25, 2018.

Extended European Search Report including Written Opinion for Application No. EP16890123.9 dated Sep. 7, 2018.

(56) References Cited

OTHER PUBLICATIONS

Extended European Search Report including Written Opinion for Application No. EP16835267.2 dated Aug. 22, 2018.
Third Party Observation for PCT/KR2016/005809 dated Sep. 29, 2017.
Third Party Observation for Application No. PCT/KR2016/003948 dated Oct. 13, 2017.
Third Party Observation for Application No. PCT/KR2016/003946 dated Oct. 31, 2017.
Buchholz, et al., Modern Superabsorbent Polymer Technology, 1998, vol. 152, pp. 199-201, New York: Wiley-vch.
Third Party Observation for Application No. 16811871.9 dated Jan. 3, 2020, 7 pages.
Third Party Observation for Application No. 16890123.9 dated Jan. 3, 2020, 4 pages.

[FIG. 1]
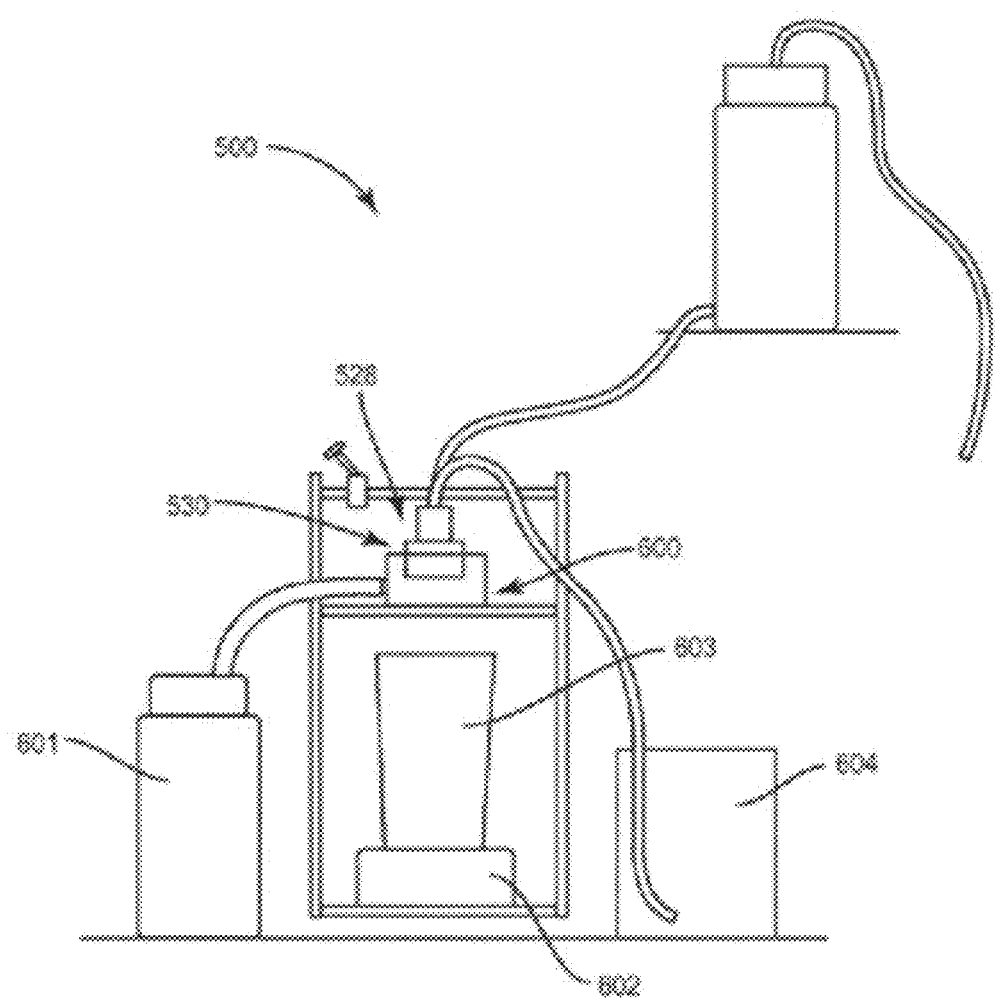

[FIG. 2]
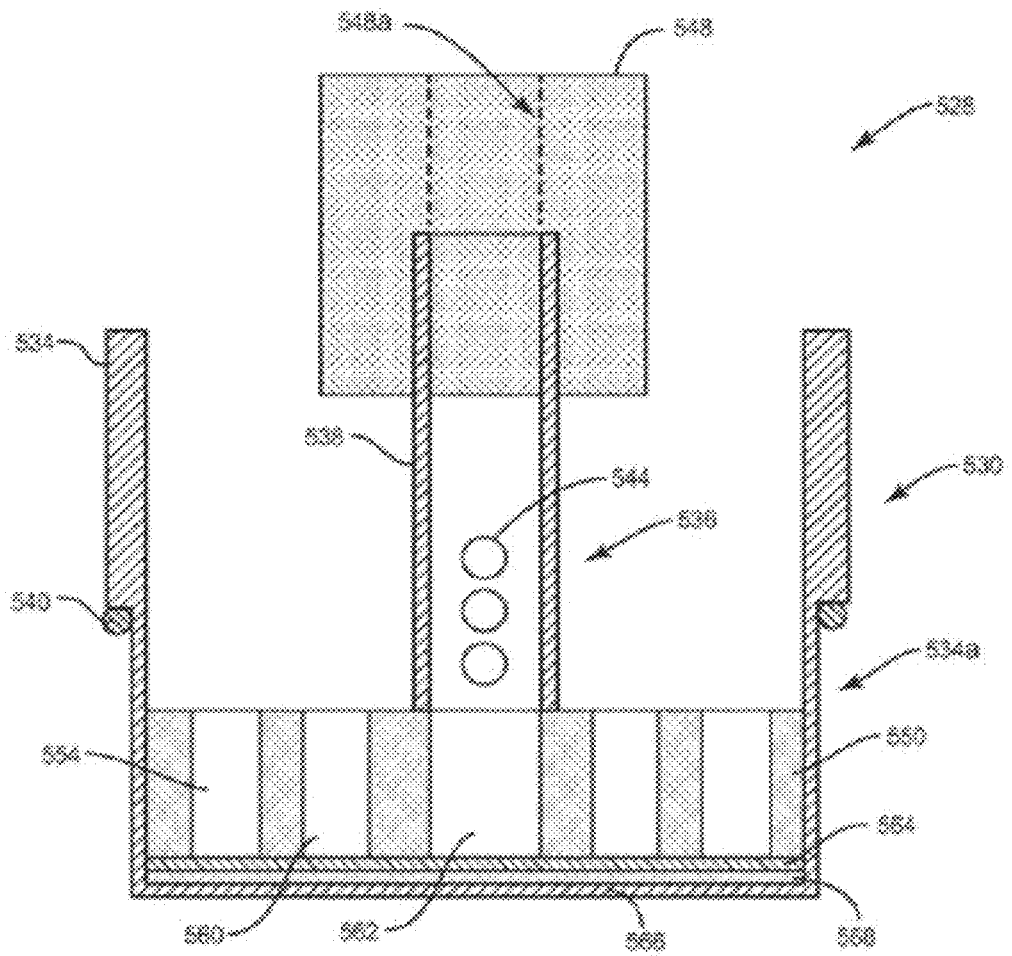

[FIG. 3]
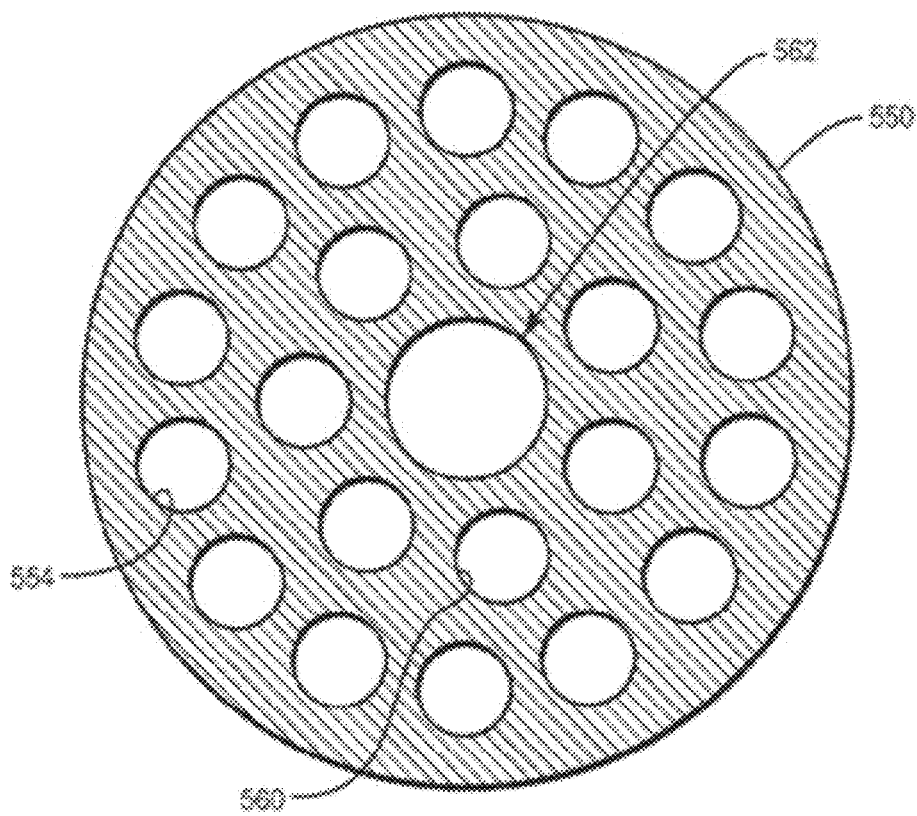

[FIG. 4]
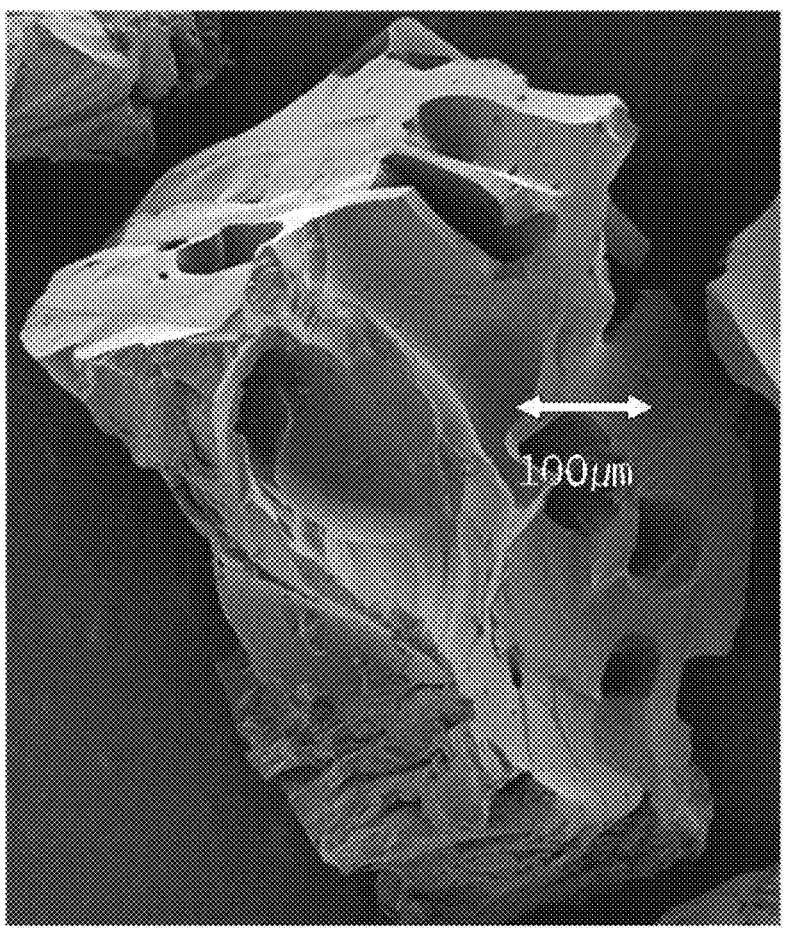

[FIG. 5]
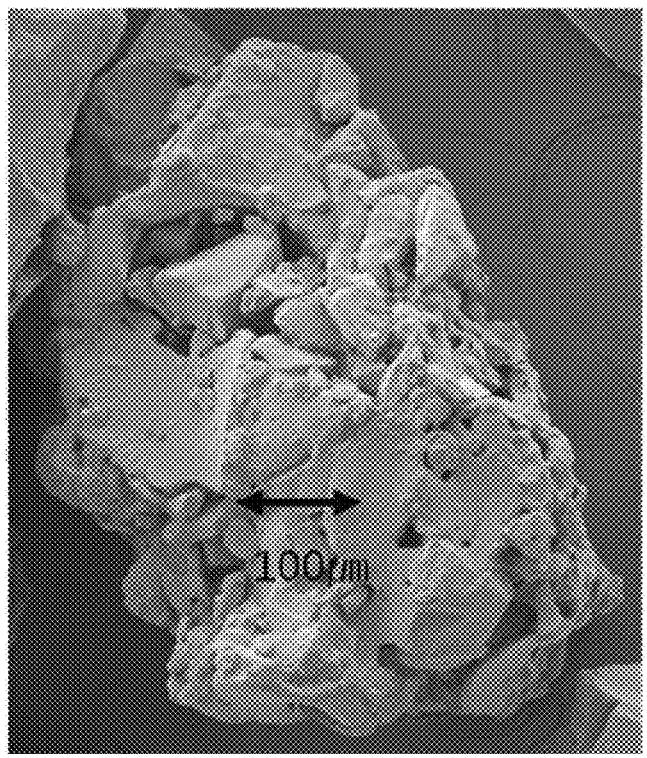
[FIG. 6]
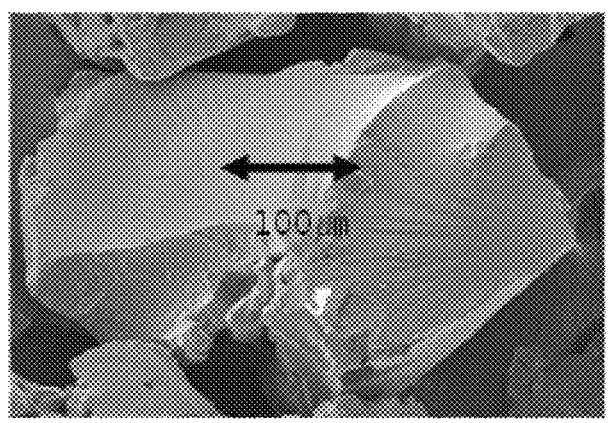

SUPER ABSORBENT POLYMER

CROSS-REFERENCE TO RELATED APPLICATION(S)

The present application is a national phase entry under 35 U.S.C. § 371 of International Application No. PCT/KR2016/006202, filed on Jun. 10, 2016, which claims priority from Korean Patent Application No. 10-2015-0084371 filed on Jun. 15, 2015, the disclosures of which are incorporated herein by reference in their entirety.

TECHNICAL FIELD

The present invention relates to a super absorbent polymer having a high absorption rate and at the same time remarkably improved anti-rewetting effects.

BACKGROUND OF ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of various products, for example, hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymer should exhibit a moisture absorbency, it should not release the absorbed water even in the external pressure, and additionally it should well retain the shape even in a state where the volume is expanded (swelled) by absorbing water, and thereby exhibit excellent liquid permeability.

However, it is known that it is difficult to improve both a centrifuge retention capacity (CRC), which is the physical property showing the basic absorption capacity and the water retaining capacity of the super absorbent polymer, and an absorbency under load (AUL), which shows the properties of well retaining the absorbed moisture even under the external pressure. This is because, when the overall crosslinking density of the super absorbent polymer is controlled to be low, the centrifuge retention capacity can be relatively high, but the crosslinking structure may be loose, the gel strength may be low and thus the absorbency under load may be lowered. On the contrary, when controlling the crosslink density to a high level to improve the absorbency under load, it becomes difficult for moisture to be absorbed between densely crosslinked structures, so that the basic centrifuge retention capacity may be lowered. For the reasons described above, there is a limitation in providing a super absorbent polymer having improved centrifuge retention capacity and improved absorbency under load together.

However, recently, as hygiene materials such as a diaper or a sanitary napkin become thinner, super absorbent polymers are required to have higher absorption performance. Among these, improving both a centrifuge retention capacity and an absorbency under load which are conflicting physical properties, improving a liquid permeability, and so on, have become an important task.

In addition, pressure can be applied to hygiene materials such as diapers or sanitary napkins due to the weight of the user. In particular, when a super absorbent polymer applied to sanitary materials such as diapers or sanitary napkins absorbs liquid and then pressure is applied due to the weight of the user, a rewetting phenomenon where some liquid absorbed in the super absorbent polymer again leak out can occur. Accordingly, various attempts have been made to improve the absorbency under load and the liquid permeability in order to suppress such rewetting phenomenon. However, concrete methods capable of effectively suppressing the rewetting phenomenon have not been suggested.

DETAILED DESCRIPTION OF THE INVENTION

Technical Problem

For resolving the aforesaid problems of the prior arts, it is an object of the present invention to provide a super absorbent polymer capable of effectively suppressing the rewetting phenomenon while exhibiting excellent absorption physical properties.

Technical Solution

In order to achieve these objects, the present invention provides a super absorbent polymer comprising:
  porous particles in which a plurality of pores having an average pore diameter of 10 μm or more are formed on the surface;
  secondary granule particles in which primary particles having an average particle diameter of 10 μm to 100 μm are aggregated; and
  non-porous particles in which 0 to 3 pores having an average pore diameter of 5 μm or more are present on the surface,
  wherein the non-porous particles are contained in an amount of 15% by weight to 75% by weight based on the total weight of the super absorbent polymer, and
  the vortex time is 20 seconds to 70 seconds.

According to one embodiment, the super absorbent polymer may include the porous particles in an amount of about 20% by weight to about 60% by weight.

Further, the super absorbent polymer may include the secondary granule particles in ah amount of about 10% by weight to about 40% by weight.

Further, according to one embodiment of the present invention, the super absorbent polymer has, preferably, a centrifuge retention capacity (CRC) for a physiological saline solution of about 28 g/g to about 35 g/g; an absorbency under load (AUL) at 0.9 psi for a physiological saline solution of about 14 g/g to about 22 g/g; and a free swell gel bed permeability (GBP) for a physiological saline solution of about 40 darcy to about 100 darcy.

Meanwhile, the present invention provides a method for preparing a super absorbent polymer comprising the steps of: carrying out a crosslinking polymerization of a monomer mixture comprising a water-soluble ethylenicaliy unsaturated monomer having at least partially neutralized acidic groups, a forming agent, a foam-promoting agent and a silicone-based surfactant in the presence of an internal crosslinking agent to form a hydrogel polymer; drying, pulverizing and classifying the hydrogel polymer to form a base polymer powder; and further crosslinking the surface of the base polymer powder in the presence of a surface crosslinking agent to form a surface crosslinked layer.

In the method for preparing a super absorbent polymer, the foaming agent may include at least one selected from the group consisting of magnesium carbonate, calcium carbonate, sodium bicarbonate, sodium carbonate, potassium bicarbonate and potassium carbonate.

Moreover, the silicon-based surfactant may be a polysiloxane containing polyether side chains.

In addition, the foam-promoting agent may be aluminum salts of inorganic acids and/or aluminum salts of organic acids.

In addition, according to an embodiment of the present invention, the foaming agent may be present in an amount ranging from about 0.05% to about 5.0% by weight based on the total weight of the monomer mixture, the foam-promoting agent may be present in an amount ranging from about 0.01% to about 3% by weight based on the total weight of the monomer mixture, and the silicone-based surfactant may be present in an amount ranging from about 0.001% to about 1% by weight based on the total weight of the monomer mixture.

Advantageous Effects

In the super absorbent polymer according to one embodiment of the present invention, the content of each of the super absorbent polymer particles having different surface shapes among particles constituting the polymer is optimized, and thus not only an absorbent capacity and an absorbency under load are excellent but also the rewetting phenomenon can be effectively prevented while having a high absorption rate.

BRIEF DESCRIPTION OF DRAWINGS

FIGS. 1 to 3 are schematic views of an exemplary apparatus for measuring the gel bed permeability and parts provided in the apparatus.

FIG. 4 is an SEM image of porous particles in which a plurality of pores having an average pore diameter of 10 μm or more, which is one component of the super absorbent polymer according to one aspect of the present invention.

FIG. 5 is an SEM image of secondary granule particles, which is one component of the super absorbent polymer according to one aspect of the present invention.

FIG. 6 is an SEM image of non-porous particles, which is one component of the super absorbent polymer according to one aspect of the present invention.

DETAILED DESCRIPTION OF THE EMBODIMENTS

The super absorbent polymer according to one aspect of the present invention comprises porous particles in which a plurality of pores having an average pore diameter of 10 μm or more are formed on the surface; secondary granule particles in which primary particles having an average particle diameter of 10 μm to 100 μm are aggregated; and non-porous particles in which 0 to 3 pores having an average pore diameter of 5 μm or more are present on the surface, wherein the non-porous particles are contained in an amount of 15% by weight to 75% by weight based on the total weight of the super absorbent polymer, and the vortex time is 20 seconds to 70 seconds.

In addition, the method for preparing a super absorbent polymer according to one aspect of the present invention comprises the steps of: carrying out a crosslinking polymerization of a monomer mixture comprising a water-soluble ethylenically unsaturated monomer having at least partially neutralized acidic groups, a forming agent, a foam-promoting agent and a silicone-based surfactant in the presence of an internal crosslinking agent to form a hydrogel polymer; drying, pulverizing and classifying the hydrogel polymer to form a base polymer powder; and further crosslinking the surface of the base polymer powder in the presence of a surface crosslinking agent to form a surface crosslinked layer.

Technical terms used in the present specification are only for illustrating specific embodiments, and they are not intended to restrict the present invention. The singular expressions used herein may include plural expressions unless the context explicitly indicate otherwise. It should be appreciated that the terms such as "including", "comprising", or "having" as used herein are intended to embody specific features, numbers, steps, components, and/or combinations thereof, and does not exclude existence or addition of other specific features, numbers, steps, components, and/ or combinations thereof.

As the present invention allows for various changes and numerous embodiments, particular embodiments will be illustrated and described in detail below. However, this is not intended to it the present invention to particular modes of practice, and it is to be appreciated that all changes, equivalents, and substitutes that do not depart from the spirit and technical scope of the present invention are encompassed in the present invention.

As used throughout the present specification, the "porous particle in which a plurality: of pores having an average pore diameter of 10 μm or more are formed on the surface" refers to grains having an irregular geometric shape in which the particle diameter of each of the particles is about 150 μm to about 850 μm, the average diameter is about 300 μm to about 600 μm, a plurality of pores, for examples, about 5 or more, or about 5 to 20 pores are formed on the surface, and the average diameter of the pores is 10 μm or more, preferably about 10 μm to about 200 μm, and more preferably about 50 μm to about 150 μm.

Also, the term "secondary granule particles" refers to particles in which primary particles having an average particle diameter of 10 μm to 100 μm are entangled with each other and aggregated in the form of granules, the particle diameter of each of the particles is about 150 μm to about 850 μm, the average particle diameter is about 300 μm to about 600 μm, the particles are formed into an irregular geometric shape by granulation, and the surface is formed of a porous structure.

In addition, the "non-porous particles" refers to particles formed into irregular polygon or irregular geometric particles in which the particle diameter of each of the particles is about 150 μm to about 850 μm, the average particle diameter is about 300 μm to about 600 μm, 0 to 3 pores having an average pore diameter of 5 μm or more, preferably 0 pore having an average pore diameter of 5 μm or more, are presented on the surface thereof, and more preferably no pores are presented on the surface.

Hereinafter, the present invention will be described in more detail.

The super absorbent polymer according to one aspect of the present invention comprises porous particles in which a plurality of pores having an average pore diameter of 10 μm or more are formed on the surface; secondary granule particles in which primary particles having an average particle diameter of 10 μm to 100 μm are aggregated; and non-porous particles in which 0 to 3 pores having an average pore diameter of 5 μm or more are present on the surface, wherein the non-porous particles are contained in an amount of 15% by weight to 75% by weight based on the total weight of the super absorbent polymer, and the vortex time is 20 seconds to 70 seconds.

As the results of experiments by the present inventors, it has been found that, when containing all three types of super absorbent polymer particles having different shapes, particularly containing non-porous particles having almost no pores on the surface in the above-described amount, such super absorbent polymer can ensure the surface area, pore size, porosity, etc. of the optimized particles, thereby exhibiting a fast absorption rate and a good liquid permeability. In addition, it was found that, due to these characteristics, the super absorbent polymer can exhibit a fast absorption rate, excellent absorbency under load and liquid permeability and the like, even in some swollen state, thereby effectively preventing the rewetting phenomenon where liquid absorbed in the super absorbent polymer again leaks out by the external pressure. The present invention has been completed on the basis of such finding.

As a result, whatever type of super absorbent polymer is produced so as to include all three types of super absorbent polymer particles having different shapes as described above, thereby providing a super absorbent polymer capable of effectively suppressing the rewetting phenomenon.

More specifically, the super absorbent polymer includes porous particles in which a plurality of pores having an average pore diameter of 10 µm or more are formed on the surface, and the shape and characteristics of these particles are as described above.

FIG. 4 is an SEM image of porous particles in which a plurality of pores having an average pore diameter of 10 µm or more, which is one component of the super absorbent polymer according to one aspect of the present invention.

Referring to FIG. 4, it can be confirmed that the porous particles, which are one component of the super absorbent polymer according to one aspect of the present invention, have an irregular geometric shape in which the particle diameter is about 150 µm to about 850 µm, a plurality of pores, about 5 or more pores, are present on the surface, and the average pore diameter is 10 µm or more, preferably about 50 µm to about 150 µm.

Further, the super absorbent polymer includes secondary granule particles in which "primary particles having an average particle diameter of 10 µm to 100 µm" are aggregated, and the shape and characteristics of these particles are also as described above.

FIG. 5 is an SEM image of secondary granule particles, which is one component of the super absorbent polymer according to one aspect of the present invention.

Referring to FIG. 5, it can be confirmed that the secondary granule particles, which are one component of the super absorbent polymer according to one aspect of the present invention, are those in which primary fine particles having an average particle diameter of about 10 µm to about 100 µm are entangled with each other. In addition, it can be confirmed that the formed secondary granule particles have a particle diameter of about 150 µm to about 850 µm, the granule particles do not have a uniform geometric shape due to granulation, and the surface thereof is formed to have a porous structure.

Moreover, the super absorbent polymer includes non-porous particles in which 0 to 3 pores having an average pore diameter of 5 µm or more are present on the surface, and the shape and characteristics of the non-porous particles are also as described above.

FIG. 6 is an SEM image of non-porous particles which is one component of the super absorbent polymer according to one aspect of the present invention.

Referring to FIG. 6, it can be confirmed that the non-porous particles, which are one component of the super absorbent polymer according to one aspect of the present invention, have irregular polygon or irregular geometric shapes with particle diameters of about 150 µm to about 850 µm, and there are no pores on its surface.

The super absorbent polymer contains the none-porous particles in an amount of about 15% to about 75% by weight. Particularly, when the content of the non-porous particles is less than about 15% by weight or exceeds about 75% by weight, there may arise a problem that an excellent absorption rate in a non-pressurized and a pressurized environment cannot be secured at the same time. Thereby, there arises a problem that the rewetting phenomenon in which the liquid absorbed by the superabsorbent resin again leaks out due to the external pressure cannot be effectively prevented.

According to one embodiment, the super absorbent polymer may include the porous particles in an amount of about 20% to about 60% by weight, preferably about 20% to 50% by weight, or 25% to 40% by weight.

Further, the super absorbent polymer may include the secondary granule particles in an amount of about 10% to about 40% by weight, preferably about 15% to 35% by weight, or 20% to 30% by weight.

As the super absorbent polymer includes the porous particles and the secondary granule particles in the above-described range, the super absorbent polymer can exhibit a high absorption rate and excellent gel strength even after it is partially swollen.

According to one embodiment of the present invention, the super absorbent polymer may have a centrifuge retention capacity (CRC) for a physiological saline solution of about 28 g/g to about 35 g/g, preferably about 28.5 g/g to about 34 g/g or about 29 g/g to about 33 g/g. Further, the super absorbent polymer may have an absorbency under load (AUL) at 0.9 psi for a physiological saline solution of about 14 g/g to about 22 g/g, preferably about 15 g/g to about 21 g/g or about 18 g/g to about 20 g/g. Further, the super absorbent polymer may have a free swell gel bed permeability (GBP) for a physiological saline solution of about 40 darcy to about 100 darcy, preferably about 45 darcy to about 90 darcy or about 50 darcy to about 80 darcy, and a vortex time of about 20 seconds to about 70 seconds, preferably about 25 seconds to about 55 seconds or about 30 seconds to about 50 seconds. In addition, the super absorbent polymer may have a rewetting amount for a physiological saline solution of less than about 1.5 g/g, preferably about 0.01 g/g to about 1.2 g/g, or about 0.1 g/g to about 1.0 g/g.

The super absorbent polymer according to the embodiment showing these characteristics not only has excellent basic absorption characteristics but also can exhibit remarkably improved anti-rewetting effects. Thereby, the super absorbent polymer can be applied for various hygiene products such as diaper and show very excellent physical properties as a whole.

In particular, when the super absorbent polymer according to the embodiment showing these characteristics contains all three types of super absorbent polymer particles having different shapes and each of the particles are contained within a specific range, it, has excellent absorption rate in a non-pressurized and a pressurized environment at the same time while having excellent basic physical properties of the super absorbent polymer, thereby exhibiting remarkably improved anti-rewetting effects, high drying efficiency and the like.

On the other hand, the centrifuge retention capacity (CRC) for a physiological saline solution can be measured according to EDANA (European Disposables and Nonwovens Association) recommended test method No. WSP 241.2. More specifically, the centrifuge retention capacity can be obtained in accordance with the following Calculation Equation 1, after classifying super absorbent polymers to prepare a super absorbent polymer having a particle diameter of 300 μm to 600 μm, and absorbing the same in physiological saline solution for 30 minutes:

$$CRC\ (g/g) = \{[W_2\ (g) - W_1\ (g)]/W_0\ (g)\} - 1 \quad (1)$$

in Calculation Equation 1, $W_0$ (g) is an initial weight (g) of the super absorbent polymer having a particle diameter of 300 μm to 600 μm, $W_1$ (g) is a weight of the device not including the super absorbent polymer, measured after dehydrating the same by using a centrifuge at 250 G for 3 minutes, and $W_2$ (g) is a weight of the device including a super absorbent polymer, measured after soaking and absorbing the super absorbent polymer having the particle diameter of 300 μm to 600 μm in 0.9 wt % physiological saline solution at room temperature for 30 minutes, and then dehydrating the same by using a centrifuge at 250 G for 3 minutes.

In addition, the absorbency under load (AUL) at 0.9 psi can be measured according to EDANA recommended test method No. WSP 242.2. More specifically, the absorbency under load can be calculated in accordance with the following Calculation Equation 2, after absorbing the super absorbent polymer in a physiological saline solution under a load of about 0.9 psi over 1 hour:

$$AUL\ (g/g) = [W_4\ (g) - W_3\ (g)]/W_0\ (g) \quad (2)$$

in Calculation Equation 2, $W_0$ (g) is an initial weight (g) of the super absorbent polymer, $W_3$ (g) is the total sum of a weight of the super absorbent polymer and a weight of the device capable of providing a load to the super absorbent polymer, and $W_4$ (g) is the total sum of a weight of the super absorbent polymer and a weight of the device capable of providing a load to the super absorbent polymer, after absorbing a physiological saline solution to the super absorbent polymer under a load (0.9 psi) for 1 hour.

$W_0$ (g) described in Calculation Equations 1 and 2 corresponds to an initial weight (g) of the super absorbent polymer, before absorbing a physiological saline solution to the super absorbent polymer, and they may be the same or different from each other.

The gel bed permeability (GRP) for a physiological saline solution was measured in units of Darcy or $cm^2$ according to the following method described in Korean Patent Application No. 10-2014-7018005. One Darcy means that it permits a flow of 1 $cm^3$/s of a fluid with viscosity of 1 cP under a pressure gradient of 1 atm/cm acting across an area of 1 $cm^2$. Gel bed permeability has the same unit as area, and 1 darcy is the same as $0.98692 \times 10^{-12}\ m^2$ or $0.98692 \times 10^{-8}\ cm^2$.

More specifically, as used herein, GBP means a penetration (or permeability) of a swollen gel layer (or bed) under conditions referred to as 0 psi free swell state (a Gel Bed Permeability (GBP) Under 0 psi Swell Pressure Test), and the GBP can be measured using the apparatus shown in FIGS. 1 to 3.

Referring to FIGS. 1-3, the test apparatus assembly 528 in a device 500 for measuring GBP includes a sample container 530 and a plunger 536. The plunger includes a shaft 538 having a cylinder hole bored down the longitudinal axis and a head 550 positioned at the bottom of the shaft. The shaft hole 562 has a diameter of about 16 mm. The plunger head is attached to the shaft, for example, by an adhesive. Twelve holes 544 are bored into the radial axis of the shaft, and three holes positioned at every 90 degrees has a diameter of about 6.4 mm. The shaft 538 is machined from a LEXAN rod or equivalent material, and has an outer diameter of about 2.2 cm and an inner diameter of about 16 mm. The plunger head 550 has seven inner holes 560 and fourteen outer holes 554, all holes having a diameter of about 8.8 mm. Further, a hole of about 16 mm is aligned with the shaft. The plunger head 550 is machined from a LEXAN rod or equivalent material and has a height of about 16 mm and a diameter sized such that it fits within the cylinder 534 with minimum wall clearance but still moves freely. The total length of the plunger head 550 and shaft 538 is about 8.25 cm, but can be machined at the top of the shaft to obtain the desired size of the plunger 536. The plunger 536 includes a 100 mesh stainless steel cloth screen 564 that is biaxially stretched to tautness and attached to the lower end of the plunger 536. The screen is attached to the plunger head 550 using a suitable solvent that causes the screen to be securely adhered to the plunger head 550. Care should be taken to avoid excess solvent moving into the openings of the screen and reducing the open area for liquid flow area. Acrylic solvent Weld-on 4 from IPS Corporation (having a place of business in Gardena, Calif., USA) can be used appropriately. The sample container 530 includes a cylinder 534 and a 400 mesh stainless steel cloth screen 566 that is biaxially stretched to tautness and attached to the lower end of the plunger 534. The screen is attached to the cylinder using a suitable solvent that causes the screen to be securely adhered to the cylinder. Care should be taken to avoid excess solvent moving into the openings of the screen and reducing the open area for liquid flow. Acrylic solvent Weld-on 4 from IPS Corporation (having a place of business in Gardena, Calif., USA) can be used appropriately. The gel particle sample (swollen super absorbent polymer), indicated as 568 in FIG. 2, is supported on the screen 566 within the cylinder 534 during testing.

Cylinder 534 may be bored from a transparent LEXAN rod or equivalent material, or it may be cut from LEXAN tubing or equivalent material, and has an inner diameter of about 6 cm (for example, a cross sectional area of about 28.27 $cm^2$), a wall thickness of about 0.5 cm and a height of about 7.95 cm. A step can be formed by machining into the outer diameter of the cylinder 534 such that a region 534a having an outer diameter of 66 mm is present at the bottom 31 mm of the cylinder 534. An O-ring 540 which fits the diameter of the region 534a may be placed on top of the step.

The annular weight 546 has a counter-bored hole of about 2.2 cm in diameter and 1.3 cm deep so it slides freely onto the shaft 538. The annular weight also has a thru-bore 548a of about 16 mm. The annular weight 548 may be made from stainless steel or from other suitable material capable of corrosion resistance in 0.9% by weight of physiological saline solution (aqueous sodium chloride solution). The combined weight of the plunger 536 and the annular weight 548 is equal to about 596 g, which corresponds to a pressure applied to the sample 568 of about 0.3 psi or about 20.7 dyne/$cm^2$ (2.07 kPa), over a sample area of about 28.27 $cm^2$.

When the test solution flows through the test apparatus during testing of the GBP, the sample container 530 generally rests on a weir 600. The purpose of the weir is to divert liquid that overflows the top of the sample container 530, and diverts the overflow liquid to a separate collection device 601. The weir can be positioned above a scale 602 with a beaker 603 resting on it to collect a physiological saline solution passing through the swollen sample 568.

In order to perform the gel bed permeability test under "free swell" conditions, the plunger 536 installed with the weight 548 is placed in an empty sample container 530, and the height from the top of the weight 548 to the bottom of the sample container 530 is measured to an accuracy of 0.01 mm using an appropriate gauge. The force to which the thickness gauge applies during the measurement should be as low as possible, preferably less than about 0.74 N. When using multiple test apparatus, it is important to keep each empty sample container 530, plunger 536 and weight 548 and track of which they are used.

Further, it is preferable that the base on which the sample container 530 is placed is flat, and the surface of the weight 548 is parallel to the bottom surface of the sample container 530. Then, a sample to be tested is prepared from the super absorbent polymer for measuring GBP. As an example, a test sample is prepared from a super absorbent polymer having a particle diameter of about 300 to about 600 μm, which is passed through a US standard 30 mesh screen and retained on a US standard 50 mesh screen. About 2.0 g of a sample is placed in a sample container 530 and spread out evenly on the bottom of the sample container. The container containing 2.0 g of sample, without the plunger 536 and the weight 548 therein, is then submerged in the 0.9 wt % physiological saline solution for about 60 minutes and allow the sample to swell under no load condition. At this time, the sample container 530 is placed on the mesh located in a liquid reservoir so that the sample container 530 is raised slightly above the bottom of the liquid reservoir. As the mesh, those which do not affect the movement of the physiological saline solution into the sample container 530 can be used. As such mesh, part number 7308 from Eagle Supply and Plastic (having a place of business in Appleton, Wis., USA) can be used. During saturation, the height of the physiological saline solution can be adjusted such that the surface within the sample container is defined by the sample, rather than the physiological saline solution.

At the end of this period, the assembly of the plunger 536 and weight 548 is placed on the saturated sample 568 in the sample container 530 and then the sample container 530, plunger 536, weight 548 and sample 568 are removed from the solution. Thereafter, before GBP measurement, the sample container 530, plunger 536, weight 548 and sample 568 are placed on a flat, large grid non-deformable plate of uniform thickness for 30 seconds. The plate will prevent liquid in the sample container from being released onto a flat surface due to surface tension. The plate has an overall dimension of 7.6 cm×7.6 cm, and each grid has a dimension of 1.59 cm long×1.59 cm wide×1.12 cm deep. A suitable plate material is a parabolic diffuser panel, catalogue number 1624K27, available from McMaster Carr Supply Company (having a place of business in Chicago, Ill., USA), which can then be cut to the proper dimensions.

Then, if the zero point has not changed from the initial height measurement, the height from the top of the weight 548 to the bottom of the sample container 530 is measured again by using the same thickness gauge as previously used. The height measurement should be made as soon as practicable after the thickness gauge is installed. The height measurement obtained from measuring the empty sample container 530, plunger 536, and weight 548 is subtracted from the height measurement obtained after saturating the sample 568. The resulting value is the thickness, or height "H" of the saturated sample 568. Further, if a plate is contained in the assembly containing the saturated sample 568, the height including the plate should be measured even when measuring the height of the empty assembly.

The GBP measurement is started by delivering a flow of 0.9% physiological saline solution into the sample container 530 containing the saturated sample 568, the plunger 536 and the weight 548. The flow rate of physiological saline solution into the container is adjusted to cause physiological saline solution to overflow the top of the cylinder 534, thereby resulting in a consistent head pressure equal to the height of the sample container 530. The physiological saline solution may be added by any suitable means that is sufficient to ensure a small, but consistent amount of overflow from the top of the cylinder, such as with a metering pump 604. The overflow liquid is diverted into a separate collection device 601. The quantity of solution passing through the sample 568 versus time is measured gravimetrically using the scale 602 and beaker 603. Data points from the scale 602 are collected every second for at least sixty seconds once the overflow has started. Data collection may be taken manually or with data collection software. The flow rate (Q) passing through the swollen sample 568 is determined in units of grams/second (g/s) by a linear least-square fit of fluid passing through the sample 568 (in grams) versus time (in seconds).

Using the data thus obtained, the gel bed permeability can be confirmed by calculating the GBP (cm²) according to the following Calculation Equation 3.

$$K=[Q \times H \times \mu]/[A \times \rho \times P] \quad (3)$$

in Calculation Equation 3,

N is a gel bed permeability (cm²),

Q is a flow rate (g/sec)

H is a height of swollen sample (cm),

μ is a liquid viscosity (poise) (about one cP for the test solution used with this Test), A is a cross-sectional area for liquid flow (28.27 cm² for the sample container used with this Test), ρ is a liquid density (g/cm³)(about one g/cm³, for the test solution used with this Test), and P is a hydrostatic pressure (dyne/cm²) (normally about 7,797 dynes/cm²).

The hydrostatic pressure is calculated from P=ρ×g×h, where ρ is a liquid density (g/cm³), g is a gravitational acceleration (nominally 981 cm/sec²), and h is a fluid height (for example, 7.95 cm for the GBP Test described herein).

Meanwhile, the vortex time can be measured in seconds according to the method described in International Publication. WO 1987/003203. More specifically, the vortex time can be calculated by measuring in seconds the amount of time required for the vortex to disappear after adding 2 grams of a super absorbent polymer to 50 mL of physiological saline solution and then stirring the mixture at 600 rpm.

The super absorbent polymer containing each of the above super absorbent polymer particles having different surface shapes in a specific amount can be provided by appropriately adjusting the structure or physical properties of various types of super absorbent polymers known in the technical field to which the present invention belongs.

More specifically, the super absorbent polymer of one embodiment essentially comprises, as a base polymer powder, a crosslinked polymer obtained by subjecting a water-soluble ethylenically unsaturated monomer to a crosslinking polymerization in the same manner as in the previous super absorbent polymer, and may include a surface crosslinked layer formed on these base polymer powders. In addition, the super absorbent polymer of one embodiment described above includes a structure adjusted so as to contain each of the super absorbent polymer particles having different surface shapes in a specific content, or an additional component.

Specifically, a foaming agent capable of generating bubbles during polymerization of the base polymer powder, a foam-promoting agent which promotes the foam generation and a silicone-based surfactant for stable foaming can be used to provide a super absorbent polymer containing each of the super absorbent polymer particles in a specific content.

More specifically, the super absorbent polymer of one embodiment can be prepared by a method comprising the steps of: carrying out a crosslinking polymerization of a monomer mixture including a water-soluble ethylenically unsaturated monomer having at least partially neutralized acidic groups, a forming agent, foam-promoting agent and a silicone-based surfactant in the presence of an internal crosslinking agent to form a hydrogel polymer; drying, pulverizing and classifying the hydrogel polymer to form a base polymer powder; and further crosslinking the surface of the base polymer powder in the presence of a surface crosslinking agent to form a surface crosslinked layer.

In the above-described preparation method, examples of the water-soluble ethylenically unsaturated monomer include at least one selected from the group consisting of anionic monomers such as acrylic acid, methacrylic acid, maleic anhydride, fumaric acid, crotonic acid, itaconic acid, 2-acrylcylethane sulfonic acid, 2-methacryloylethane sulfonic acid, 2-(metha)acryloylpropane sulfonic acid, or 2-(meth)acrylamide-2-methyl propane sulfonic acid, or salts thereof; non-ionic hydrophilic monomers such as (meth) acrylamide, N-substituted (meth)acrylate, 2-hydroxyethyl (meth)acrylate, 2-hydroxypropyl (meth)acrylate, methoxypolyethyleneglycol (meth)acrylate, or polyethyleneglycol (meth)acrylate; and amino group-containing unsaturated monomers such as (N,N)-dimethylaminoethyl (meth)acrylate or (N,N)-dimethylaminopropyl (meth)acrylamide, or quaternized products thereof. Among these, acrylic acid or a salt thereof, for example, an alkali metal salt such as acrylic acid in which at least a part of the acrylic acid is neutralized, and/or a sodium salt thereof, can be used. By using such monomer, it becomes possible to prepare a super absorbent polymer having more excellent physical properties. In the case wherein the alkali metal salt of the acrylic acid is used as the monomer, it is possible to use acrylic acid after neutralizing the same with a basic compound such as caustic soda (NaOH). In this case, the degree of neutralization of the water-soluble ethylenically unsaturated monomer can be adjusted to about 50% to 95% or about 70% to 85%, and within these ranges, it is possible to provide a super absorbent polymer having excellent centrifuge retention capacity without fear of precipitation during neutralization.

In the monomer mixture containing the water-soluble ethylenically unsaturated monomer, the concentration of the water-soluble ethylenically unsaturated monomer may be about 20% to about 60% by weight, or about 40% to about 50% by weight, based on the total weight of the monomer mixture including each raw material and the solvent, and may be an adequate concentration in consideration of the polymerization time and the reaction conditions. However, when the concentration of the monomer is excessively low, the yield of the super absorbent polymer may be low, and there may be a problem in economic efficiency. In contrast, when the concentration of the monomer is excessively high, it may cause problems in processes that some of the monomer may be precipitated or the pulverization efficiency of the prepared hydrogel polymer appears low in the pulverizing process, and thus the physical properties of the super absorbent polymer may decrease.

As the foaming agent used to form a plurality of pores in the base polymer powder, the form generation can be promoted by the foam-promoting agent, and a carbonate capable of stable foaming may be used by the silicone-based surfactant.

More specific examines of these carbonates include at least one selected from the group consisting of magnesium carbonate, calcium carbonate, sodium bicarbonate, sodium carbonate, potassium bicarbonate, and potassium carbonate.

As the foam-promoting agent for promoting the foaming of the foaming agent, an aluminum salt of inorganic acid such as aluminum sulfate or aluminum chloride or an aluminum salt of organic acid such as aluminum lactate, aluminum oxalate, aluminum citrate, aluminum urate and the like may be used.

If the hydrogel polymer is formed using only the foaming agent and the silicone-based surfactant without using the foam-promoting agent, or if the content of the foaming agent and the foam promoting agent exceeds the specific range, the optimized porosity and pore structure cannot be realized, and thereby the content of each of the different super absorbent polymer particles deviates from the above range.

As the silicone-based surfactant for inducing a stable form generation due to the foaming agent and the foam-promoting agent, a polysiloxane containing polyether side chain or the like may be used. Among them, a silicone-based surfactant having a structure in which a polyether side chain such as poly (ethylene oxide) or poly (propylene oxide) is bonded to a polydimethylsiloxane skeleton can be used. Examples of such surfactants include Xiameter® OFX-0190 Fluid (PEG/PPG-18/18 Dimethicone), OFX-0193 Fluid (PEG-12 Dimethicone), OFX-5220 Fluid (PEG/PPG-17/18 Dimethicone), OFX-5324 Fluid (PEG-12 Dimethicone), and the like.

If a hydrogel polymer is formed by using only a foaming agent and a foam-promoting agent without using a silicone-based surfactant or by using another type of a surfactant other than a silicone based surfactant, the super absorbent polymer is formed into an excessively porous structure, the centrifuge retention capacity and the absorbency under load are lowered, and the bulk density is low, which makes it difficult to handle at the time of classification or the like. Accordingly, when the silicone-based surfactant is not used, the average particle diameter of the gel partially swollen under the above-described conditions according to one embodiment is deviated from the above range.

In the monomer mixture containing the water-soluble ethylenically unsaturated monomer or the like, the concentration of the foaming agent may be about 0.05% to about 5.0% by weight, preferably about 0.1% to about 3.0% by weight or about 0.15% to about 3% by weight, based on the total weight of the monomer mixture. The concentration of the foam-promoting agent may be about 0.01% to about 3% by weight or about 0.15% to about 2% by weight, based on the total weight of monomer mixture. The concentration of the silicone-based surfactant may be about 0.001% to about 1% by weight or about 0.01% to about 0.5% by weight, based on the total weight of monomer mixture.

When a foaming agent, a foam-promoting agent, and a silicone-based surfactant are used in these ranges, the pore size and the porosity etc. of the super absorbent polymer can be optimized and the absorption surface area can be remarkably improved, resulting in an improvement in the absorption rate and anti-rewetting effect.

Meanwhile, in order to allow a large amount of forms or bubbles generated by using the foaming agent, the foam-promoting agent and the silicone-based surfactant to be contained in the hydrogel polymer, and to stably maintain a plurality of pores contained in the hydrogel polymer even in a subsequent process, the hydroxyl group-containing compound may be used in the step of forming the hydrogel polymer.

More specifically, when the hydroxy group-containing compound is used in the step of forming the hydrogel polymer, the viscosity of the polymer solution can be improved during the crosslinking polymerization of the monomer mixture containing the water-soluble ethylenically unsaturated monomer or the like, thereby shortening the gelation time. This makes it to effectively prevent a large amount of forms or bubbles generated by the foaming agent or the like from dropping off from the polymerization liquid, so that a large amount of foams or bubbles are contained in the hydrogen polymer. In addition, the hydroxy group-containing compound can be included in the finally produced super absorbent polymer, thus improving the wettability of the super absorbent polymer. Thereby, the non-pressurized absorption rate and the pressurized absorption rate of the super absorbent polymer can be further increased.

The such hydroxy group-containing compounds that can be used herein may be compounds such as polyvinyl alcohol, or polyalkylene glycols such as polyethylene glycol. The concentration of such hydroxy group-containing compound can be used in an amount of about 0.1% to 1% by weight based on the total weight of the monomer mixture. The absorption area and wettability of the super absorbent polymer can be effectively increased within the range of these contents.

As the internal crosslinking agent for introducing the basic crosslinking structure into the base polymer powder, any internal crosslinking agent having a crosslinkable functional group conventionally used for producing a super absorbent polymer can be used without any limitation. However, in order to improve the physical properties of the super absorbent polymer by introducing an appropriate crosslinking structure into the base polymer powder, polyfunctional acrylate compound having a plurality of ethylene oxide groups may be used as an internal crosslinking agent. More specific examples of such internal crosslinking agent include at least one selected from the group consisting of polyethylene glycol diacrylate (PEGDA), glycerin diacrylate, glycerin triacrylate, unmodified or ethoxylated trimethylolpropane triacrylate (TMPTA), hexanediol diacrylate, and triethylene glycol diacrylate. Such internal crosslinking agent may be included at a concentration of about 0.01% to about 0.5% by weight based on the monomer mixture to crosslink the polymerized polymer.

In addition, the monomer mixture may further include a polymerization initiator generally used for producing a super absorbent polymer.

Specifically, the polymerization initiator that can be used herein includes a thermal polymerization initiator or a photopolymerization initiator by UV irradiation, depending on the polymerization method. However, even in the case of using the photopolymerization method, because a certain amount of heat is generated by the ultraviolet irradiation or the like and a certain degree of heat is generated according to the progress of the exothermic polymerization reaction, a thermal polymerization initiator may be additionally included.

The photopolymerization initiator can be used without any limitation as long as it is a compound capable of forming a radical by a light such as an UV ray.

The photopolymerization initiator may include, for example, at least one initiator selected from the group consisting of a benzoin ether, a dialkyl acetophenone, a hydroxyl alkylketone, a phenyl glyoxylate, a benzyl dimethyl ketal, an acetyl phosphine, and an α-aminoketone. Meanwhile, specific examples of the acyl phosphine may include normal lucirin TPO, namely, 2,4,6-trimethyl-benzoyl-trimethyl phosphine oxide. More various photopolymerization initiators are well disclosed in "UV Coatings: Basics, Recent Developments and New Application" written by Reinhold Schwalm, (Elsevier, 2007), p 115, however the photopolymerization initiator is not limited to the above-described examples.

The photopolymerization initiator may be included in the concentration of about 0.01% to about 1.0% by weight based on the monomer mixture. When the concentration of the photopolymerization initiator is excessively low, the polymerization rate may become slow, and when the concentration of the photopolymerization initiator is excessively high, the molecular weight of the super absorbent polymer becomes small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4$)$_2S_2O_8$), and the like; and examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutyionitrile, 2,2-azobis-[2-(2-imidazolin-2-yl) propane] dihydrochloride, 4,4-azobis-(4-cyanovaleric acid) and the like. More various thermal polymerization initiators are well disclosed in "Principle of Polymerization" written by Odian, (Wiley, 1981), p 203, however the thermal polymerization initiator is not limited to the above-described examples.

The thermal polymerization initiator can be included in the concentration of about 0.001% to about 0.5% by weight based on the monomer mixture. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

In addition, the monomer mixture may further include additives such as a thickener, a plasticizer, a preservation stabilizer, an antioxidant, etc., if necessary.

The raw materials such as the water-soluble ethylenically unsaturated monomer, the forming agent, the foam-promoting agent, the silicone-based surfactant, the photopolymerization initiator, the thermal polymerization initiator, the internal crosslinking agent, and the additives may be prepared in the form of the monomer mixture solution which is dissolved in a solvent.

The solvent that can be used herein is not limited as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer mixture.

Meanwhile, the method for preparing a hydrogel polymer by the thermal polymerization or photopolymerization of the monomer mixture may be typically carried out in a reactor like a kneader equipped with agitating spindles to facilitate the foam generation.

The hydrogel polymer, which is discharged from the outlet of the reactor by supplying a polymerization energy source such as heat or light to a reactor such as a kneader having an agitating shaft as described above, may have a size of centimeters or millimeters, depending on the type of the agitating spindles equipped in the reactor. Specifically, the size of the hydrogel polymer obtained may vary depending on the concentration of the monomer mixture injected thereto, the injection rate or the like, and the hydrogel polymer having a weight average particle diameter of 2 mm to 50 mm can be generally obtained.

The hydrogel polymer obtained by such method may have typically a moisture content of about 40% to about 80% by weight. Meanwhile, the term "moisture content" as used herein refers to the content of moisture in the total weight of the hydrogel polymer, which is obtained by subtracting the weight of the dried polymer from the weight of the hydrogel polymer. Specifically, it is defined as a value calculated by measuring the weight loss according to evaporation of water in the polymer during the drying process by increasing the temperature of the polymer through infrared heating. In this case, the moisture content is measured under the drying conditions where the temperature is increased from room temperature to 180° C. and then the temperature is maintained at 180° C., and the total drying time is set to 20 minutes, including 5 minutes for the temperature rising step.

After the monomer is subjected to crosslinking polymerization, the base polymer powder can be obtained through drying, pulverization, classification, etc., and through a process such as pulverization and classification, the base polymer powder, and the super absorbent resin obtained therefrom are suitably manufactured and provided so as to have a particle diameter of about 150 µm to 850 µm. More specifically, at least about 95% by weight or more of the base polymer powder and t super absorbent resin obtained therefrom has a particle diameter of about 150 µm to 850 µm and the fine particles having a particle diameter of less than about 150 µm can be less than about 3% by weight.

As the particle diameter distribution of the base polymer powder and the super absorbent polymer is adjusted to the preferable range, the super absorbent polymer finally produced can exhibit excellent absorbent properties.

On the other hand, the method of drying, pulverization and classification will be described in more detail below.

First, when drying the hydrogel polymer, a coarsely pulverizing step may be further carried out before drying in order to increase the efficiency of the drying step, if necessary.

A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarsely pulverizing step may be carried out so that the particle diameter of the hydrogel polymer becomes about 2 mm to about 10 mm.

Pulverizing the hydrogel polymer into a particle diameter of less than 2 mm is technically not easy due to its high moisture content, and agglomeration may occur between the pulverized particles. Meanwhile, if the polymer is pulverized into a particle diameter of greater than 10 mm, the effect of increasing the efficiency in the subsequent drying step may be insignificant.

The hydrogel polymer coarsely pulverized as above or the hydrogel polymer immediately after polymerization without the coarsely pulverizing step is subjected to a drying step. In this case, the drying temperature of the drying step may be about 150° C. to about 250° C.

When the drying temperature is less than 150° C., it is likely that the drying time becomes too long or the physical properties of the super absorbent polymer finally formed is deteriorated, and when the drying temperature is higher than 250° C., only the surface of the polymer is dried, and thus it is likely that fine powder is generated during the subsequent pulverizing step and the physical properties of the super absorbent polymer finally formed is deteriorated.

Meanwhile, the drying time may be about 20 to about 90 minutes, in consideration of the process efficiency and the like, but it is not limited thereto.

In the drying step, the drying method may also be selected and used without any limitation if it is a method generally used for drying the hydrogel polymer. Specifically, the drying step may be carried out by a method such as hot air supply, infrared irradiation, microwave irradiation or ultraviolet irradiation. When the drying step as above is finished, the moisture content of the polymer may be about 0.1% to about 10% by weight.

Subsequently, the dried polymer obtained through the drying step is subjected to a pulverization step.

The polymer powder obtained through the pulverizing step may have a particle diameter of about 150 µm to about 850 µm. Specific examples of a pulverizing device that can be used to achieve the above particle diameter may include a pin mill, a hammer mill, a screw mill, a roll mill, a disc mill, a jog mill or the like, but the present invention is not limited thereto.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of about 150 µm to about 850 µm is classified and only the polymer powder having such a particle diameter is subjected to the surface crosslinking reaction and finally commercialized. Since the particle diameter distribution of the base polymer powder obtained through such a process has already been described above, a further detailed description thereof will be omitted.

On the other hand, after the step of forming the base polymer powder described above, the surface cross-linked layer can be formed by further crosslinking the surface of the base polymer powder in the presence of the surface crosslinking agent, whereby a super absorbent polymer can be produced.

The surface crosslinked layer can be formed by using a surface crosslinking agent conventionally used in the production of a super absorbent polymer. As the surface crosslinking agent, any one known in the technical field to which the present invention belongs can be used without any limitation. More specific examples thereof include at least one selected from the group consisting of ethylene glycol, propylene glycol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate and propylene carbonate. Such surface crosslinking agent may be used in an amount of about 0.01 to 3% by weight based on the total weight of the base polymer powder.

In the surface crosslinking step, the surface crosslinking reaction can be carried out by further adding one or more inorganic substances selected from the group consisting of silica, clay, alumina, silica-alumina composite material, titania, zinc oxide and aluminum sulfate. The inorganic substance can be used in the form of powder or liquid, and in particular, it can be used as alumina powder, silica-alumina powder, titania powder or nanosilica solution. In addition, the inorganic material can be used in an amount of about 0.05% to about 2% by weight based on the total weight of the base polymer powder.

Moreover, in the surface crosslinking step, as the surface crosslinking proceeds by adding a polyvalent metal cation in place of the inorganic substance or together with the inorganic substance, the surface crosslinking structure of the super absorbent polymer can be further optimized. This is presumably because such a metal cation can further reduce the crosslinking distance by forming a chelate with the carboxyl group (COOH) of the super absorbent polymer.

There is also no limitation on the method of adding the surface crosslinking agent, and optionally an inorganic substance and/or an a polyvalent metal cation to the base polymer powder. For example, a method of adding surface crosslinking agent and a base polymer powder to a reaction tank and mixing them, or a method of spraying a surface cross-linking agent or the like to the base polymer powder, or a method of adding a base polymer powder and a surface crosslinking agent to a continuously operated mixer and mixing them, or the like, may be used.

When the surface crosslinking agent is added, water and methanol can be additionally mixed and added. When water and methanol are added, there is an advantage that the surface crosslinking agent can be uniformly dispersed in the base polymer powder. At this time, the amount of water and methanol added can be appropriately adjusted in order to induce a more uniform dispersion of the crosslinking agent, prevent the aggregation phenomenon of the polymer powders, and further optimize the depth of penetration of the surface crosslinking agent to the polymer powders.

The surface crosslinking reaction may be performed by heating the base polymer powder to which the surface crosslinking agent is added at a temperature of about 100° C. or more for about 20 minutes or more. In particular, in order to produce a super absorbent polymer that more suitably fulfills physical properties according to one embodiment, the conditions of the surface crosslinking step can adjust the maximum reaction temperature to about 100° C. to 250° C. The retention time at the maximum reaction temperature can be adjusted under the conditions of about 20 minutes or more, or about 20 minutes or more and 1 hour or less. In addition, at a temperature at the beginning of the first reaction, for example, at a temperature of about 100° C. or more, the temperature raising time until reaching the maximum reaction temperature can be controlled to be about 10 minutes or more, or about 10 minutes or more and 1 hour or less.

A temperature raising means for surface crosslinking is not particularly limited. Heating medium may be supplied or heat source may be directly supplied and heated. The kind of heating medium that can be used herein may include steam, hot wind, temperature-raised fluid such as hot oil, and the like, but is not limited thereto, and the temperature of the supplied heating medium may be appropriately selected in consideration of the means of heating medium, temperature-raising speed, and target temperature. Meanwhile, the directly supplied heat source may include electric heating, gas heating, but is not limited to the above examples.

The super absorbent polymer obtained according to the above-described preparation method can be partially swollen under the above-mentioned conditions to easily form a gel having a uniform particle diameter distribution, so that the partially swollen gel can exhibit an average particle diameter in the above-mentioned range. That is, the super absorbent polymer obtained according to the above-described preparation method is optimized pore size and porosity due to the use of a foaming agent, a foam-promoting agent and a silicone-based surfactant, and thus it can exhibit excellent absorption rate and high gel strength even under pressurized and non-pressurized conditions, thereby effectively preventing the rewetting phenomenon.

Hereinafter, the action and effects of the present invention will be described in detail by way of specific Examples. However, these Examples are given for illustrative purposes only, and the scope of the invention is not intended to be limited thereto.

Example 1: Preparation of Super Absorbent Polymer

A solution (solution A) in which 11 g of 0.5% IRGA-CUPE 819 initiator (110 ppm based on the monomer mixture) diluted with acrylic acid and 26 g of 5% polyethylene glycol diacrylate (PEGDA, molecular weight 400) diluted with acrylic acid were mixed was reared.

Then, a solution (solution B) of 5% trimethylolpropane triacrylate containing 9 mol % of ethylene oxide (Ethoxylated-TMPTA, IMP (EO) 9TA, M-3190 manufactured by Miwon Specialty Chemical Co., Ltd.) diluted with acrylic acid was prepared.

37 g of the solution A was injected into a 2 L glass reactor surrounded by a jacket through which a heat medium pre-cooled at 25° C. was circulated, to which 14 g of the solution B was injected. 1% OFX-0193 (XIAMETER®) diluted with acrylic acid was injected as the silicone-based surfactant to the glass reactor and mixed. Then, 800 g of 24% caustic soda solution (solution C) was slowly added dropwise to the glass reactor and mixed. After the temperature of the mixture increased to 72° C. or higher by neutralization heat upon dropwise addition of the solution C, the mixed solution was left until it was cooled. The degree of neutralization of acrylic, acid in the mixed solution thus obtained was about 70 mol %.

Meanwhile, 5% sodium bicarbonate solution (solution D) diluted with water and 28 g of 4% sodium persulfate solution diluted with water were dissolved to prepare a solution (solution E-1).

Then, when the temperature of the mixed solution was cooled to about 45° C., 14 g of the solution D previously prepared was injected into the mixed solution and mixed, and at the same time, the solution E-1 was injected.

Then, the above prepared solution was poured in a Vat-type tray (15 cm in width×15 cm in length) installed in a square polymerizer which had a light irradiation device installed at the top and was preheated to 80° C. Subsequently, the mixed solution was irradiated with light. It was confirmed that a gel was formed on the surface after about 20 seconds from light irradiation, and it was confirmed that polymerization reaction occurred simultaneously with foaming after about 30 seconds from light irradiation. Subsequently, the reaction was allowed for additional 2 minutes, and the polymerized sheet was taken out and cut into a size of 3 cm×3 cm. Then, the cut sheet was subjected to a crumb through a chopping process using a meat chopper to prepare crumbs.

The crumbs were then dried in an oven capable of shifting airflow up and down. The crumbs were uniformly dried by flowing hot air at 180° C. from the bottom to the top for 15 minutes and from the top to the bottom for 15 minutes, so that the dried product had a water content of 2% or less.

The dried product was pulverized using a pulverizer and classified to obtain a base polymer having a particle diameter of 150 to 850 μm. The base polymer thus prepared had a centrifuge retention capacity of 36.5 g/g and a water-soluble component content of 14.2% by weight. The centrifuge retention capacity was measured according to EDANA recommended test method No. WSP 241.2 and the water-soluble component content was measured according to EDANA recommended test method No. WSP 270.2

Thereafter, 100 g of the base polymer was mixed with a crosslinking agent solution obtained by mixing 3 g of water, 3 g of methanol, 0.4 g of ethylene carbonate, and 0.5 g of Aerosil 200 (EVONIK), and then surface crosslinking reaction was carried out at 190° C. for 30 minutes. The resultant was pulverized and sieved to obtain a surface-crosslinked super absorbent polymer having a particle diameter of 150 to 850 μm.

Example 2: Preparation of Super Absorbent Polymer

A base polymer was prepared in the same manner as in Example 1, except that the solution D was used in an amount of 15 g instead of 34 g. The base polymer thus prepared had a centrifuge retention capacity of 35.2 g/g and a water-soluble component content of 13.9% by weight. The surface-crosslinked super absorbent polymer having a particle diameter of 150 to 850 μm was obtained in the same manner as in Example 1, by using the prepared base polymer.

Example 3: Preparation of Super Absorbent Polymer 0.1 g of Aerosil 200 (Aerosil 200, EVONIK) was added to 100 g of the surface-crosslinked super absorbent polymer prepared in Example 1 and the mixture was dry-mixed to obtain a super absorbent polymer.

Example 4: Preparation of Super Absorbent Polymer

A base polymer was prepared in the same manner as in Example 1, except that the solution (E-2 solution) in which 0.8 g of aluminum sulfate was dissolved in 28 g of 4% sodium persulfate solution diluted with water was used instead of the solution E-1. The base polymer thus prepared had a centrifuge retention capacity of 37.4 g/g and a water-soluble component content of 15.1% by weight. The surface-crosslinked super absorbent polymer having a particle diameter of 150 to 850 μm was obtained in the same manner as in Example 1, by using the prepared base polymer.

Example 5: Preparation of Super Absorbent Polymer

A solution (solution A) in which 11 g of 0.5% IRGACURE 819 initiator. (110 ppm based on the monomer mixture) diluted with acrylic acid and 26 g of 5% polyethylene glycol diacrylate (PEGDA, molecular weight: 400) diluted with acrylic acid were mixed was prepared.

Then, a solution (solution B) of 5% trimethylolpropane triacrylate containing 9 mol % of ethylene oxide (Ethoxylated-TMPTA, TMP (EO) 9TA, M-3190 manufactured by Miwon Specialty Chemical Co., Ltd.) diluted with acrylic acid was prepared.

37 g of the solution A was injected into a 2 L glass reactor surrounded by a jacket through which a heat medium pre-cooled at 25° C. was circulated, to which 14 g of the solution B was injected. Then, 800 g of 24% caustic soda solution (solution C) was slowly added dropwise to the glass reactor and mixed. After the temperature of the mixture was increased to 72° C. or higher by neutralization heat upon dropwise addition of the solution C, the mixed solution was left until it was cooled. The degree of neutralization of acrylic acid in the mixed solution thus obtained was about 70 mol %.

Meanwhile, 5% sodium bicarbonate solution (solution)) diluted with water, a solution (solution E-2) in which 1.6 g of aluminum sulfate was dissolved in 28 of 5% sodium bicarbonate solution diluted with water, and 1% OFX-0193 (XIAMETER®) solution (solution F) diluted with water were prepared.

Then, when the temperature of the mixed solution was cooled to about 45° C., a mixture of the solution. D and the solution F previously prepared was injected to the mixed solution and mixed, and at the same time, the solution E-2 was injected.

Then, the above prepared solution was poured in a Vat-type tray (15 cm in width×15 cm in length) installed in a square polymerizer which had a light irradiation device installed at the top and was preheated to 80° C. Subsequently, the mixed solution was irradiated with light. It was confirmed that a gel was formed on the surface after about 20 seconds from light irradiation, and it was confirmed that polymerization reaction occurred simultaneously with foaming after about 30 seconds from light irradiation. Subsequently, the reaction was allowed for additional 2 minutes, and the polymerized sheet was taken out and cut into a size of 3 cm×3 cm. Then, the cut sheet was subjected to crumb through a chopping process using a meat chopper to prepare crumbs.

The crumbs were then dried in an oven capable of shifting airflow up and down. The crumbs were uniformly dried by flowing hot air at 180° C. from the bottom to the top for 15 minutes and from the top to the bottom for 15 minutes, so that the dried product had a water content of 2% or less.

The dried product was pulverized using a pulverizer and classified to obtain a base polymer having a particle diameter of 150 to 850 μm. The base polymer thus prepared had a centrifuge retention capacity of 35.8 g/g and a water-soluble component content of 13.7% by weight.

Thereafter, 100 g of the base polymer was mixed with a crosslinking agent solution obtained by mixing 3 g of water, 3 g of methanol, 0.4 g of ethylene carbonate, and 0.5 g of Aerosil 200 (EVONIK), and then surface crosslinking reaction was carried out at 190° C. for 30 minutes. The resultant was pulverized and sieved to obtain a surface-crosslinked super absorbent polymer having a particle diameter of 150 to 850 μm.

Comparative Example 1: Preparation of Super Absorbent Polymer

A base polymer was prepared in the same manner as in Example 5, except that 28 g of 4% sodium bicarbonate solution (solution E-0) diluted with water was injected instead of the mixture of the solution D and the solution F and the solution E-2. The base polymer thus prepared had a centrifuge retention capacity of 39.3 g/g and a water-soluble component content of 19.3% by weight. The surface-crosslinked super absorbent polymer having a particle diameter of 150 to 850 μm was obtained in the same manner as in Example 5, by using the prepared base polymer.

Experimental Example: Evaluation of Super Absorbent Polymer

The properties of the super absorbent polymers prepared in Examples 1 to 5 and Comparative Example 1 were evaluated by the following methods, and the results are shown in Table 1 below.

(1) Average Particle Diameter of Super Absorbent Polymer

The average particle diameter of each of the super absorbent polymers prepared in Examples 1 to 5 and Comparative Example 1 was measured according to EDANA WSP 220.2 (European Disposables and Nonwovens Association, EDANA).

(2) Confirmation of the Content of Each Particle According to Shape

Powder samples of the super absorbent polymers prepared in Examples 1 to 5 and Comparative Example 1 were well placed a base plate and then the surface shape was observed with a scanning electron microscope (2.0 kV).

An image was obtained with a width of 3 mm and a length of 2 mm of a photograph enlarged by a scanning electron microscope at a magnification of 50 times, and the particles contained in the image were distinguished into porous particles, secondary granule particles, and non-porous particles. The content (% by weight) was calculated by using the particle diameter of the particles observed and the average density value of each particle.

(Density of porous particles: 0.55 g/mm$^3$, density of secondary granule particles: 0.55 g/mm$^3$, density of non-porous particles: 0.65 g/mm$^3$).

(3) Centrifuge Retention Capacity (CRC)

The centrifuge retention capacity (CRC) for a physiological saline solution was measured for each super absorbent polymer prepared in Examples 1 to 5 and Comparative Example 1 according to EDANA recommended test method No. WSP 241.2.

Specifically, a super absorbent polymer having a particle diameter of 300 to 600 μm which was passed through a U.S. standard 30 mesh screen and retained on a U.S. standard 50 mesh screen was prepared from a super absorbent polymer for evaluating the centrifuge retention capacity.

Then, the super absorbent polymer $W_0$ (g, about 0.2 g) having a particle diameter of 300 to 600 μm was uniformly placed into a nonwoven fabric-made bag, followed by sealing. Then, the bag was immersed in 0.9% by weight of physiological saline solution at room temperature. After 30 minutes, the bag was dehydrated at 250 G for 3 minutes with a centrifuge, and the weight $W_2$ (g) of the bag was then measured. Meanwhile, after carrying out the same procedure using an empty bag not containing a super absorbent polymer, the resultant weight $W_1$ (g) was measured.

Using the respective weights thus obtained, a centrifuge retention capacity was confirmed according to the following Calculation Equation 1:

$$CRC\ (g/g) = \{[W_2\ (g) - W_1\ (g)]/W_0\ (g)\} - 1 \quad (1)$$

in Calculation Equation 1, $W_0$ (g) is an initial weight (g) of the super absorbent polymer having a particle diameter of 300 μm to 600 μm, $W_1$ (g) is a weight of the device not including the super absorbent polymer, measured after dehydrating the same by using a centrifuge at 250 G for 3 minutes, and $W_2$ (g) is a weight of the device including a super absorbent polymer, measured after soaking and absorbing the super absorbent polymer having a particle diameter of 300 μm to 600 μm in 0.9% by weight of physiological saline solution at room temperature for 30 minutes, and then dehydrating the same by using a centrifuge at 250 G for 3 minutes.

(4) Absorbency Under Load (AUL)

The absorbency under load (AUL) at 0.9 psi for a physiological saline solution was measured for each super absorbent polymer prepared in Examples 1 to 5 and Comparative Example 1 according to EDANA recommended test method No. WSP 242.2.

Specifically, a 400 mesh stainless steel net was installed in the bottom of a plastic cylinder having an inner diameter of 25 mm. $W_0$ (g, 0.16 g) of a super absorbent polymer for measuring the absorbency under load were uniformly scattered on the screen under conditions of room temperature and relative humidity of 50%. Then, a piston which could provide a load of 6.3 kPa (0.9 psi) uniformly was put thereon. At this time, the piston used was designed so that the outer diameter was slightly smaller that 25 mm and thus it could move freely up and down without any gap with the inner wall of the cylinder. Then, the weight $W_3$ (g) of the device prepared in this way was measured.

After putting a glass filter having a diameter of 90 mm and a thickness of 5 mm in a Petri dish having the diameter of 150 mm, 0.90% by weight of a physiological saline solution was poured in the dish. At this time, the physiological saline solution was poured until the surface level became equal to the upper surface of the glass filter. Then, a sheet of filter paper having a diameter of 90 mm was put on the glass filter.

Subsequently, the prepared device was placed on the filter paper so that the super absorbent polymer in the device was swelled by a physiological saline solution under load. After one hour, the weight $W_4$ (g) of the device containing the swollen super absorbent polymer was measured.

Using the weight thus measured, the absorbency under load was calculated according to the following Calculation Equation 2.

$$AUL\ (g/g) = [W_4\ (g) - W_3\ (g)]/W_0\ (g) \quad (2)$$

in Calculation Equation 2, $W_0$ (g) is an initial weight (g) of the super absorbent polymer, $W_3$ (g) is the total sum of a weight of the super absorbent polymer and a weight of the device capable of providing a load to the super absorbent polymer, and $W_4$ (g) is the total sum of a weight of the super absorbent polymer and a weight of the device capable of providing a load to the super absorbent polymer, after absorbing a physiological saline solution to the super absorbent polymer under a load (0.9 psi) for 1 hour.

(5) Gel Bed Permeability (GBP)

The gel bed permeability (GBP) for a physiological saline solution was measured for each super absorbent polymer prepared in Examples 1 to 5 and Comparative Example 1 according to the following method described in Korean Patent Application No. 10-2014-7018005.

Specifically, the apparatus shown in FIGS. 1 to 3 was used to measure the free swell GBP. First, the plunger 536 installed with the weight 548 was placed in an empty sample container 530, and the height from the top of the weight 548 to the bottom of the sample container 530 was measured to an accuracy of 0.01 mm using an appropriate gauge. The force to which the thickness gauge applied during the measurement was adjusted to less than about 0.74 N.

Meanwhile, a super absorbent polymer having a particle diameter of about 300 to about 600 μm was obtained by selectively classifying a super absorbent polymer which was passed through a US standard 30 mesh screen and retained on a US standard 50 mesh screen.

About 2.0 g of the super absorbent polymer classified in this way was placed in the sample container 530 and spread out evenly on the bottom of the sample container. Then, the container not containing the plunger 536 and the weight 548 therein, was submerged in 0.9 wt % physiological saline solution for about 60 minutes and allowed the super absorbent polymer to swell under no load condition. At this time, the sample container 530 was placed on the mesh located in a liquid reservoir so that the sample container 530 was raised slightly above the bottom of the liquid reservoir. As the mesh, those which did not affect the movement of the physiological saline solution into the sample container 530 were used. During saturation, the height of the physiological saline solution could be adjusted such that the surface within the sample container was defined by the swollen super absorbent polymer, rather than the physiological saline solution.

At the end of this period, the assembly of the plunger 536 and weight 548 was placed on the swollen super absorbent polymer 568 in the sample container 530 and then the sample container 530, plunger 536, weight 548 and swollen super absorbent polymer 568 were removed from the solution. Thereafter, before GBP measurement, the sample container 530, plunger 536, weight 548 and swollen super absorbent polymer 568 were placed on a flat, large grid non-deformable plate of uniform thickness for about 30 seconds. The height from the top of the weight 548 to the bottom of the sample container 530 was measured again by using the same thickness gauge as previously used. Then, the height measurement value of the device in which the plunger 536 equipped with the weight 548 was placed in the empty sample container 530 was subtracted from the height measurement value of the device including the swollen super absorbent polymer 568, thereby obtaining the thickness or height "H" of the swollen super absorbent polymer.

For the GBP measurement, 0.9 wt % physiological saline solution was flowed into the sample container 530 containing the swollen super absorbent polymer 568, the plunger 536 and the weight 548. The flow rate of a physiological saline solution into the container was adjusted to cause the physiological saline solution to overflow the top of the cylinder 534, thereby resulting in a consistent head pressure equal to the height of the sample container 530. Then, the quantity of solution passing through the swollen super absorbent polymer 568 versus time was measured gravimetrically using the scale 602 and beaker 603. Data points from the scale 602 were collected every second for at least sixty seconds once the overflow has started. The flow rate (Q) passing through the swollen super absorbent polymer 568 was determined in units of grams/second (g/s) by a linear least-square fit of fluid passing through the sample 568 (in grams) versus time (in seconds).

Using the data thus obtained, the GBP (cm$^2$)) was calculated according to the following Calculation Equation 3.

$$K=[Q \times H \times \mu]/[A \times \rho \times P] \quad (3)$$

in Calculation Equation 3,

K is a gel bed permeability (cm$^2$),

Q is a flow rate (g/sec)

H is a height of swollen super absorbent polymer (cm),

μ is a liquid viscosity (poise) (about 1 cP for the test solution used with this Test), A is a cross-sectional area for liquid flow (28.27 cm$^2$ for the sample container used with this Test), ρ is a liquid density (g/cm$^3$) (about 1 g/cm$^3$, for the physiological saline solution used with this Test), and P is a hydrostatic pressure (dynes/cm$^2$) (normally about 7,797 dyne/cm$^2$).

The hydrostatic pressure was calculated from P=ρ×g×h, where ρ is a liquid density (g/cm$^3$), g is a gravitational acceleration (nominally 981 cm/sec$^2$), and h is a fluid height (for example, 7.95 cm for the GBP Test described herein)

At least two samples were tested and the results were averaged to determine the free swell GBP of the super absorbent: polymer, and the unit was converted to darcy (1 darcy=0.93692×10$^{-8}$ UW).

(6) Vortex Time of Super Absorbent Polymer

The vortex time of the super absorbent polymer was measured in seconds according to the method described in International Publication WO 1987/003208.

Specifically, the vortex time (or absorption rate) was calculated by measuring in seconds the amount of time required for the vortex to disappear after adding 2 grams of a super absorbent polymer to 50 mL of physiological saline solution and then stirring the mixture at 600 rpm.

(7) Rewetting Properties of Super Absorbent Polymer

The rewetting properties of the super absorbent polymers of Examples 1 to 5 and Comparative Example 1 were evaluated by modifying a known measurement method of absorbency under load.

First, a super absorbent polymer having a particle diameter of 300 to 600 μm which was passed through a U.S. standard 30 mesh screen and retained on a U.S. standard 50 mesh screen was prepared from a super absorbent polymer for evaluating the rewetting properties.

Meanwhile, the 400 mesh stainless steel screen was attached to the bottom of a plastic cylinder having an inner diameter of 25 mm. Then, W$_0$ (g 0.16 g) of the previously prepared super absorbent polymer was uniformly scattered on the screen under conditions of room temperature and relative humidity of 50%, to thereby prepare a test assembly.

Then, a first filter paper having a diameter of 25 mm was laid on the PE dish having a diameter of 80 mm, and the test assembly was placed thereon. Thereafter, 4 g of 0.9 wt % physiological saline solution was injected around the test assembly, so that the super absorbent polymer could absorb the physiological saline solution under no load condition. When the physiological saline solution was completely absorbed by the super absorbent polymer, it was left for 10 minutes so that the super absorbent polymer was swollen sufficiently.

On the other hand, as Whatman Grade No. 4 filter paper, 10 sheets of filter papers having a diameter of 30 mm or more were overlapped to prepare a second filter paper. Then, the weight $W_5$ (g) of the second filter paper was measured.

After lifting and removing the test assembly from the first filter paper, a piston capable of uniformly applying a load of 5.1 kPa (0.7 psi) onto the swollen super absorbent polymer was added. At this time, the piston was designed so that the outer diameter was slightly smaller than 25 mm and thus it could move freely up and down without any gap with the inner wall of the cylinder.

Then, the test assembly to which the piston was added was placed on the previously prepared second filter paper. After lifting and removing the test assembly to which the piston has been added after 2 minutes, the weight $W_6$ (g) of the second filter paper was again measured.

Using each of the weights thus obtained, the rewetting amount (g/g) was calculated by the Calculation Equation 4.

$$\text{Rewetting Amount (g/g)} = [W_6(g) - W_5(g)]/W_0(g) \quad (4)$$

in Calculation Equation 4, $W_0$ (g) is an initial weight (g) of the super absorbent polymer, $W_5$ (g) is an initial weight (g) of the second filter paper, $W_6$ (g) is a weight (g) of the second filter paper that has absorbed a liquid leaking out from the super absorbent polymer swelled for 2 minutes under a load (0.7 psi), after the super absorbent polymers have absorbed 25 times their weight in a physiological saline solution for a sufficient time under no load condition.

The results of the above measurement are shown in Table 1 below.

TABLE 1

| | Content (wt %) | | | | | | Vortex | Rewetting |
| | Porous particle | Secondary granule particle | Non-porous particle | CRC [g/g] | AUL [g/g] | GBP [darcy] | time [sec] | amount [g/g] |
| --- | --- | --- | --- | --- | --- | --- | --- | --- |
| Example 1 | 36 | 25 | 39 | 30.7 | 19.7 | 57 | 35 | 0.4 |
| Example 2 | 29 | 23 | 48 | 30.1 | 19.4 | 53 | 37 | 0.6 |
| Example 3 | 38 | 24 | 38 | 30.4 | 19.1 | 75 | 32 | 0.5 |
| Example 4 | 34 | 26 | 40 | 30.8 | 19.5 | 62 | 40 | 0.7 |
| Example 5 | 32 | 24 | 44 | 30.3 | 19.9 | 63 | 39 | 0.7 |
| Comparative Example 1 | 11 | 18 | 71 | 31.1 | 18.7 | 60 | 85 | 1.8 |

Referring to Table 1, it is confirmed that the super absorbent polymers according to Examples of the present invention not only are excellent in the centrifuge retention capacity and the absorbency under load but also have a faster vortex time and a less rewetting amount than Comparative Example, thereby effectively preventing the rewetting phenomenon.

EXPLANATION OF SIGN

500: GBP measuring device
528: Test apparatus assembly
530: Sample container
534: Cylinder
534a: Region having an outer diameter of 66 mm
536: Plunger
538: Shift
540: O-ring
544, 554, 560: hole
548: Annular weight
548a: Thru-bore
550: Plunger head
562: Shaft hole
564: 100 mesh stainless steel cross screen
566: 400 mesh stainless steel cross screen
568: Sample
600: weir
601: Collection device
602: Scale
603: Beaker
604: Gauge pump

The invention claimed is:

1. A super absorbent polymer comprising:
   porous particles in which a plurality of pores having an average pore diameter of 10 μm or more are formed on the surface;
   secondary granule particles in which primary particles having an average particle diameter of 10 μm to 100 μm are aggregated; and
   non-porous particles in which 0 to 3 pores having an average pore diameter of 5 μm or more are present on the surface,
   wherein the non-porous particles are contained in an amount of 15% by weight to 75% by weight based on the total weight of the super absorbent polymer, and the vortex time is 20 seconds to 70 seconds.

2. The super absorbent polymer according to claim 1, wherein the porous particles are contained in an amount of 20% by weight to 60% by weight.

3. The super absorbent polymer according to claim 1, wherein the secondary granule particles are contained in an amount of 10% by weight to 40% by weight.

4. The super absorbent polymer according to claim 1, wherein the super absorbent polymer has a centrifuge retention capacity (CRC) for a physiological saline solution of about 28 g/g to about 35 g/g; an absorbency under load (AUL) at 0.9 psi for a physiological saline solution of about 14 g/g to about 22 g/g; and a free swell gel bed permeability (GBP) for a physiological saline solution of about 40 darcy to about 100 darcy.

* * * * *